United States Patent [19]

Szurkowski

[11] Patent Number: 5,631,846
[45] Date of Patent: May 20, 1997

[54] UPSTREAM COMMUNICATIONS FOR INTERACTIVE NETWORKS

[75] Inventor: Edward S. Szurkowski, Maplewood, N.J.

[73] Assignee: Lucent Technologies Inc., Murray Hill, N.J.

[21] Appl. No.: 396,042

[22] Filed: Feb. 28, 1995

[51] Int. Cl.$^6$ .................................................. H04B 15/00
[52] U.S. Cl. ...................................... 364/514 B; 324/605
[58] Field of Search ........................... 364/574, 514 C, 364/514 B; 455/5.1, 3.1; 375/200; 380/2; 348/12; 324/528, 539, 555, 605

[56] References Cited

U.S. PATENT DOCUMENTS

| | | | |
|---|---|---|---|
| 3,750,022 | 7/1973 | Curry et al. | 455/5.1 |
| 4,290,142 | 9/1981 | Schnee et al. | 455/3.1 |
| 4,586,078 | 4/1986 | Citto et al. | 348/12 |
| 4,752,954 | 6/1988 | Masuko | 380/20 |
| 4,912,721 | 3/1990 | Pidgeon et al. | 375/200 |

OTHER PUBLICATIONS

U.S. Patent Application Ser. No. 07/965,492, entitled "Interactive Television Converter," filed Oct. 23, 1992.

U.S. Patent Application Ser. No. 08/029205 entitled "Method And Apparatus For The Coding And Display Of Overlapping Windows With Transparency," filed Mar. 10, 1993.

U.S. Patent Application Ser. No. 07/965493 entitled "Interactive Television Multicasting," filed Oct. 23, 1992.

U.S. Patent No. 5,373,288, entitled "Initializing Terminals In A Signal Distribution System", D. E. Blahut, filed Oct. 23, 1992 and issued Dec. 13, 1994, Class: 340/825.08.

U.S. Application Ser. No. 07/997985 entitled "Program Server For Interactive Television System," filed Dec. 28, 1992.

U.S. Patent Application Ser. No. 08/056973 entitled "Integrated Television Services System," filed May 3, 1993.

U.S. Patent Application Ser. No. 08/056974 entitled "System For Composing Multimedia Signals For Interactive Television Services," filed May 3, 1993.

U.S. Patent Application Ser. No. 08/175059 entitled "Method of Controlling Multiple Processes Using Finite State Machines," filed Dec. 29, 1993.

U.S. Pat. No. 5,323,447, entitled "Apparatus And Method for Modifying A Frequency Hopping Sequence Of A Cordless Telephone Operating In A Frequency Hopping System," M. E. Gillis et al., filed Nov. 1, 1991 and Issued Jun. 21, 1994, Class: 379/61.

U.S. Pat. No. 5,044,010, entitled "Arrangement And Method For Selecting An Available Communication Channel for A Cordless Telephone," R. Frenkiel et al., filed Mar. 29, 1990 and issued Aug. 27, 1991, Class: 379/61.

"Ops Find Reverse Path Is An Upstream Battle," *Multichannel News*, Sep. 26, 1994, pp. 43, 49.

*Primary Examiner*—Emanuel T. Voeltz
*Assistant Examiner*—Thomas Peeso

[57] ABSTRACT

Disclosed are methods and associated devices for minimizing the undesirable affects of interference signals in the upstream spectrum of an multiuser interactive system. The method comprises receiving an initial upstream signal at a multiuser interactive processor in a multiuser interactive system. The frequency of the initial upstream signal is at a frequency within the upstream spectrum. Next, the multiuser interactive processor determines a measure of interference associated with at least a portion of the upstream spectrum. Based upon the measure of interference, an upstream channel, from within the upstream spectrum, is selected. The upstream channel is within the upstream spectrum. Finally, the multiuser interactive processor transmits a second signal representative of the upstream channel.

18 Claims, 2 Drawing Sheets

UPSTREAM COMMUNICATIONS FOR INTERACTIVE NETWORKS

FIELD OF THE INVENTION

The present invention relates to interactive communications. More specifically, the present invention relates to providing a sufficient "upstream" channel from a device to a multiuser interactive system.

BACKGROUND OF THE INVENTION

Interactive television ("ITV") systems that send and receive radio frequency ("RF") signals are subject to interference. The RF signals that are sent may be sent "upstream" or "downstream."

In an ITV system, an upstream signal is one that is sent from a set top box to a server. A downstream signal is one that is sent from the server to the set top box.

In typical ITV systems that have optical fiber and coaxial cable carrying RF signals, a portion of the frequency spectrum referred to as the upstream spectrum (e.g., typically from about 5 MHz to about 40 MHz) is reserved for transmission of upstream signals. A much larger portion of the frequency spectrum, referred to as the downstream spectrum (e.g., typically from about 50 MHz to about 1 GHz), is reserved for downstream signals. The downstream spectrum has a larger bandwidth than the upstream spectrum because downstream signals (e.g., the sending of an encoded video) typically require more bandwidth than upstream signals (e.g., the sending of a request to show the video).

Unfortunately, the upstream spectrum is subject to significant interference signals from frequency sources external to the ITV system. "Ops Find Reverse Path Is An Upstream Battle," *Multichannel News*, Sept. 26, 1994 at page 43, states that:

[c]able operators readying the 5–30 MHz region of the RF spectrum for home-to-headend communications are finding it to be an upstream paddle.

The barrier: interference of all shapes and sizes, from unlikely suspects including neon signs, sun spots and forced-air gas furnaces to ham radio transmissions. The interfering signals leak into corroded, poorly shielded or badly installed connectors and wreak havoc on data moving from the home to the headend.

Thus, interfering signals pose a problem to upstream communications.

If the interfering signals impact the upstream signals too much, the upstream signals may be incomprehensible to an ITV processor designed to receive the upstream signals. Thus, it is desirable to design an ITV system wherein upstream signals may be sent without this interference rendering the upstream signals incomprehensible.

SUMMARY OF THE INVENTION

The present invention operates to minimize the undesirable affects of interference signals in the upstream spectrum of an multiuser interactive system. Advantageously, the methods and associated devices are used in multiuser interactive systems to allow for upstream signals to be received clearly and comprehensibly by a multiuser interactive processor despite interference signals within the upstream spectrum.

In accordance with an illustration of the present invention, an initial upstream signal is received by the multiuser interactive processor. The frequency of the initial upstream signal is a frequency within the upstream spectrum. Next, the multiuser interactive processor determines a measure of interference associated with at least a portion of the upstream spectrum. Based upon the measure of interference, an upstream channel, from within the upstream spectrum, is selected. Finally, the multiuser interactive processor transmits a second signal representative of the upstream channel. This embodiment may be realized by a unique adaptation of a conventional single user channel selection technology to a multiuser context. Such single user technology exists with respect to cordless telephones.

In addition to the advantage mentioned above, illustratively, the initial upstream signal comprises an indication of a requested upstream channel bandwidth which advantageously allows the step of selecting the upstream channel to be based upon the requested upstream channel bandwidth.

Other advantages of the present will become apparent to those skilled in the art from the Figures and the text related thereto.

DETAILED DESCRIPTION

Introduction

The present invention will be described in the context of an ITV system environment. The details of such an environment are disclosed in U.S. patent application Ser. No. 07/965,492 entitled "Interactive Television Converter" filed Oct. 23, 1992 and assigned to the assignee of the present invention is incorporated herein by reference as if set forth in its entirety. Also incorporated herein by reference as if set forth in their entirety are: U.S. patent application Ser. No. 08/029,205 entitled "Method And Apparatus For The Coding And Display Of Overlapping Windows With Transparency" filed Mar. 10, 1993; U.S. patent application Ser. No. 07/965,493 entitled "Interactive Television Multicasting" filed Oct. 23, 1992; U.S. Pat. No. 5,373,288 entitled "Initializing Terminals In A Signal Distribution System" issued Dec. 13, 1994; U.S. patent application Ser. No. 07/997,985 entitled "Program Server For Interactive Television System" filed Dec. 28, 1992; U.S. patent application Ser. No. 08/056,973 entitled "Integrated Television Services System" filed May 3, 1993; U.S. patent application Ser. No. 08/056,974 entitled "System For Composing Multimedia Signals For Interactive Television Services" filed May 3, 1993; and U.S. patent application Ser. No. 08/175,059 entitled "Method Of Controlling Multiple Processes Using Finite State Machines" filed Dec. 29, 1993, all of which are assigned to the assignee of the present invention. U.S. Pat. Nos. 5,323,447 and 5,044,010, relating to single user systems, are also incorporated by reference herein as if set forth in their entirety.

For clarity of explanation, the illustrative embodiment of the present invention is described as comprising individual functional blocks and/or boxes. The functions these blocks and/or boxes represent may be provided through the use of either shared or dedicated hardware, including, but not limited to, hardware capable of executing software. Use of the term "processor" should not be construed to refer exclusively to hardware capable of executing software.

Further, the illustrative embodiment may comprise digital signal processor (DSP) hardware such as the AT&T DSP16 or DSP32C, read-only memory (ROM) for storing software performing the operations discussed below, and random access memory (RAM) for storing DSP results. Very large scale integration (VLSI) hardware embodiments, as well as custom VLSI circuitry in combination with a general purpose DSP circuit, may also be provided.

Illustrative Embodiment

Figure 1:
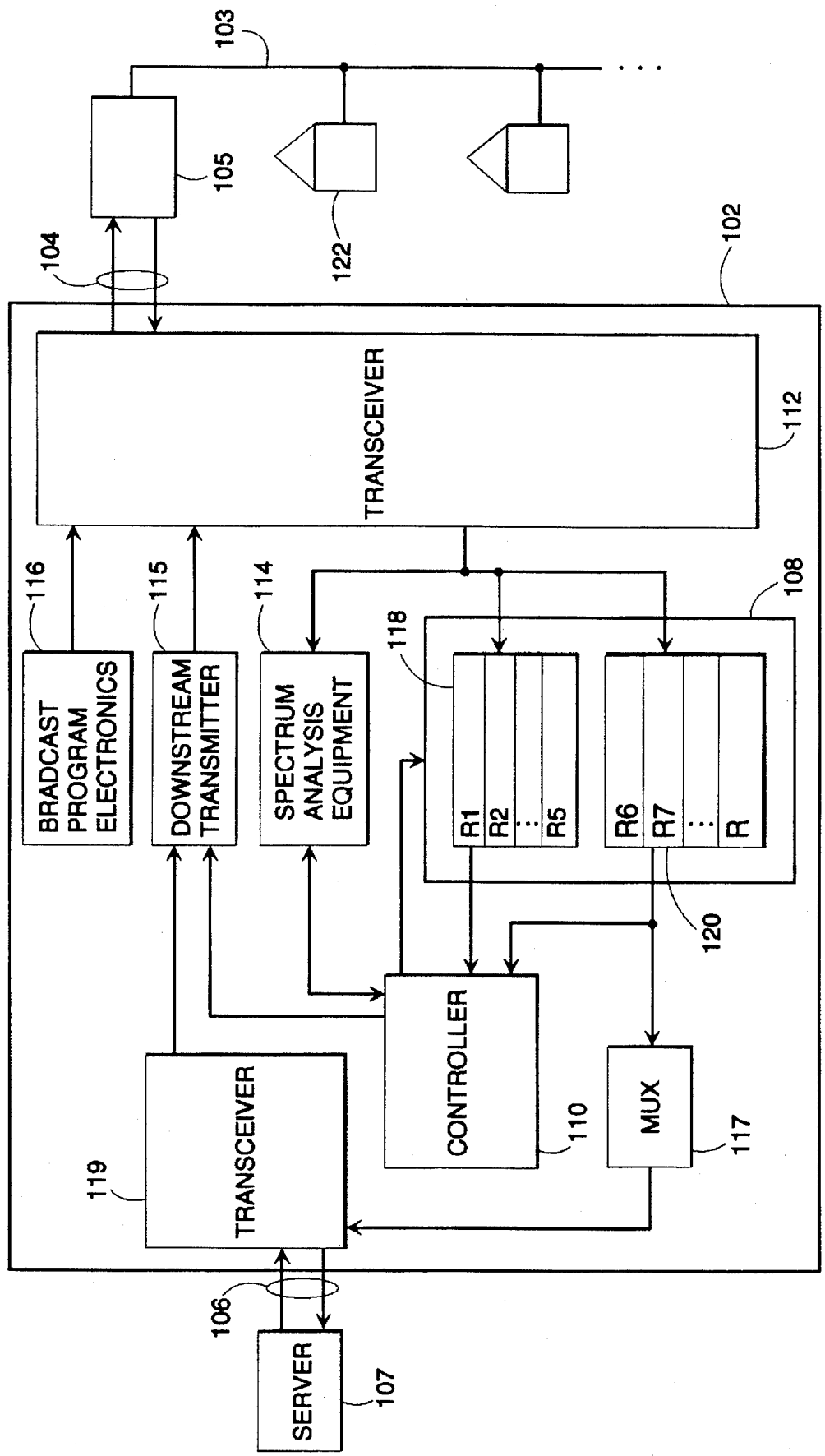
FIG. 1 shows a detailed view of a headend in an ITV system.

Referring to FIG. 1, the headend 102 is coupled to a first set of fiber optic cables 104 and a second set of fiber optic cables 106. The first set of fiber optic cables 104 is used, in connection with a coaxial cable distribution system 103 and an optical transceiver node 105, to provide interactive communications with a set of homes. The second set of fiber optic cables 106 is used to provide interactive communications with other devices associated with the ITV system such as a server 107. Those skilled in the art will appreciate that, depending upon the proximity of portions of the ITV system to each other, other elements not shown may be used to facilitate communications. For example, if the server 107 is a long distance from the headend 102, wide area networks and asynchronous transfer mode devices may be used facilitate communications between the headend 102 and the server 107. It should be noted that only one transceiver 112 is shown. However, multiple transceivers, identical in function to transceiver 112, may be used in conjunction with additional sets of fiber optic cables, optical transceiver nodes, and coaxial cable distribution systems identical in function to the first set of fiber optic cables 104, the optical transceiver node 105, and the coaxial cable distribution system 103, respectively. Also, only server 107 is shown although multiple servers may be used.

Again referring to FIG. 1, the headend 102 comprises a set of receivers 108, a controller 110, a transceiver 112 for communicating with the first set of fiber optic cables 104, a set of spectrum analysis equipment 114, broadcast program electronics 116, a transceiver 119 for communicating with the second set of fiber optic cables 106, a downstream transmitter 115, and a communications multiplexer 117. Those skilled in the art will appreciate that there may be a set of downstream transmitters. The elements are connected as shown. The set of receivers 108 comprises a set of initialization receivers 118, labelled R1 through R5, and a set of other receivers 120 labelled R6 through RN.

Figure 2:
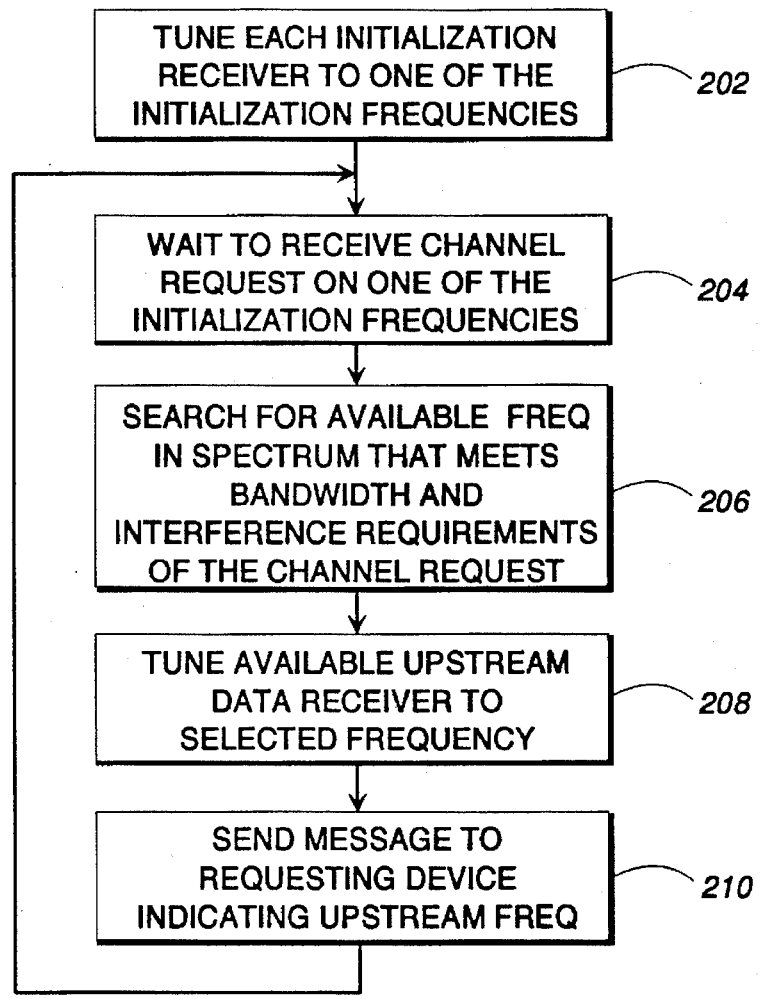
FIG. 2 shows a flowchart detailing the operation of the headend shown in FIG. 1.

We will now describe the method of selecting the upstream channel such that upstream signals sent on the upstream channel will not be noticeably affected by interference. The description will refer to FIGS. 1 and 2. It should be noted that the headend 102 is being shown, illustratively, in a configuration appropriate for providing interactive television services.

When the ITV system is activated by a service provider, each receiver in the set of initialization receivers 118 is tuned to a specific frequency in the upstream spectrum as shown in functional block 202. The specific frequencies are typically spread out within the upstream spectrum to reduce the likelihood that interference in a particular portion of the upstream spectrum will disable every receiver in the set of initialization receivers 118. Collision problems may arise if many subscribers turn on their set top boxes at the same time (e.g., after a power failure). However, to lessen this problem, each set top box, once turned on, may wait a random amount of time prior to sending an initial upstream signal. Further, selection of the particular frequency at which the set top box will send the initial upstream signal may also be random.

After having tuned the set of initialization receivers 118 to their respective upstream frequencies, the headend 102 simply waits to receive an initial upstream signal from a set top box. This is indicated in functional block 204.

When a subscriber at the remote location 122 activates a user terminal device (e.g., a set top box), the set top box sends the initial upstream signal to the headend 102. The initial upstream signal is sent at a particular frequency via the coaxial cable distribution system 103, connector 105, and the first set of fiber optic cables 104 (collectively referred to herein as "the path 124"). The particular frequency is, e.g., the frequency to which R1 is tuned. Further, the initial upstream signal comprises information regarding a requested bandwidth. The requested bandwidth is the amount of bandwidth that is necessary, for a given application, to interact with the ITV system and more explicitly the server 107.

After receiving the initial upstream signal but before transmitting a second signal, the headend 102 performs many functions as shown in functional block 206. Upon completion of the process shown in functional block 206, the headend 102 transmits the second signal representative of the upstream channel identifying a receiver from the other set of receivers 120 with which to communicate and/or a frequency at which to communicate upstream signals.

In functional block 206, upon receipt of the initial upstream signal in the transceiver 112, the transceiver 112 communicates with an appropriate initialization receiver, e.g., R1, in the set of initialization receivers 118. The appropriate initialization receiver, in addition to the set of spectrum analysis equipment 114, communicates with the controller 110. The communication from the appropriate initialization receiver informs the controller 110 that a subscriber is attempting to use the ITV system. Also, the communication informs the controller 110 of the bandwidth requested by the set top box. The communication from the set of spectrum analysis equipment 114 informs the controller about available frequency ranges.

More specifically, the controller 110 performs two functions in selecting the upstream channel. The controller 110 determines the available frequency ranges within the upstream that are available that satisfy a requested upstream channel bandwidth. Also, the controller 110 ascertains a measure of interference associated with each available frequency range in the upstream spectrum. This is done by using a combination of real-time measurements of the signal strength of the interference signals in the upstream spectrum and historical information about the interference signals in the upstream spectrum over time. For example, characteristics of the interference signals, such as frequency, bandwidth, and strength, may vary depending upon, e.g., the day of the week, the time of day, etc. . . . .

In order to gather historical information and real-time measurements, the set of spectrum analysis equipment 114 monitors each upstream channel within the upstream spectrum. While e.g., scanning each upstream channel, the set of spectrum analysis equipment 114 determines the power on the upstream channel. The power on each upstream channel is sent to the controller 110. The controller 110 finds and selects an upstream channel whose measure of interference is below a threshold value. The measure of interference for a given upstream channel is represented by the power level in given upstream channel (e.g., frequency band) over which the upstream signal would be sent. Since the controller can determine which upstream channels are already allocated at any given time, if the power level on a channel is above a certain threshold, the controller 110 can determine whether it is due to interference from noise in the upstream channel and/or signals from another user who is already assigned to the upstream channel. This determination may be based upon the power level in the upstream channel. In order to gather historical information, the controller simply stores the signals representing the power levels over time. Typically, the threshold value for the measure of interference ranges from −20 dBm to −50 dBm. Those skilled in the art will appreciate that the more robust the modulation technique that will be used on the upstream signal, the more interference the upstream channel will tolerate. In other words, if a robust modulation technique is used, the lower the bit error rate on a channel will be for a given amount of interference. As long as the bit error rate is below a certain value, upstream signals may be sent on the upstream channel without being noticeably affected by interference.

The controller 110 may select the upstream channel in a variety of manners. The only restrictions, as noted in the above paragraph, are that the upstream channel must: (1) have a measure of interference below a threshold; (2) be available; and (3) have a large enough bandwidth to support the requested upstream channel bandwidth. Thus, the headend could function to select the first frequency range meeting these restrictions. However, this may result in fragmentation of the upstream spectrum. Thus, alternatively, the headend could function to select the first frequency range that best fits the bandwidth requirement (e.g., leaves the smallest gaps in the upstream spectrum).

It should be noted that, from the vantage point of the set top box, the particular frequency at which the initial upstream signal is sent corresponds to an initialization receiver, e.g., R1, in the headend 102. If there is no response to the initial upstream signal within a predetermined amount of time, the set top box selects another particular frequency that corresponds to another initialization receiver, e.g., R2. This is repeated until the set top box receives, via the path 124, a second signal representative of the upstream channel over which the set top box should communicate with the headend 102, indicating that the process is complete.

Yet again referring to FIG. 2, having selected an upstream channel from the upstream spectrum, the controller 110 tunes a receiver, e.g., R6, from the set of other receivers 120 to the upstream channel. This is done in accordance with functional block 208.

Finally, the controller 110, via downstream transmitter 115, transceiver 112 and the path 124, transmits the second signal representative of the upstream channel to the set top box via functional block 210. Based upon the second signal, the set top box at the remote location 122 tunes its upstream transmitter to the frequency corresponding to, e.g., the frequency of R6. The receiver in the set of initialization receivers 118 that received the initial upstream signal is now ready to accept another initial upstream signal.

The initialization procedure discussed above may be applied a plurality of times to establish upstream channels with a plurality of subscribers. After such initialization is complete and the headend 102 is communicating with one or more subscriber locations, the headend 102 functions as follows. The communications multiplexer 117 takes as its input a set of low bandwidth signals from the set of other receivers 120 and functions to transmit a high bandwidth output signal. Each low bandwidth signal is representative of an upstream signal sent from a remote location, e.g., 122, via the path 124. The low bandwidth signal from e.g., remote location 122 is received by transceiver 112 and sent to, e.g., R6. R6 sends the signal to the multiplexer 117 which in turn combines the signal with other upstream signals to produce a high bandwidth output signal. The high bandwidth output signal is sent to the transceiver 119 and then, via the second set of fiber optic cables, to the server 107. This allows for upstream communications between remote locations and the server 107. Further, the broadcast program electronics are used for providing non-interactive programming to, e.g., a remote location 122.

As will be appreciated by those skilled in the art, when the user at the remote subscriber location 122 navigates through ITV applications, the requested bandwidth may vary. As the subscriber at the remote location 122 selects various applications provided by the server 107, different upstream channels with different bandwidths may be used. For example, the subscriber needs more bandwidth to participate in an interactive game than to request a video on demand. Thus, those skilled in the art will appreciate that the system could monitor the requested bandwidth dynamically and rearrange the spectrum when efficient to do so (e.g., increase the requested bandwidth when a user switches from viewing a video on demand to playing an interactive game). In this scenario, the "initial upstream signal" may be received on an already established upstream channel. Thus, the initial upstream signal is received by the set of other receivers 120, not the set of initialization receivers 118.

Figure 3:
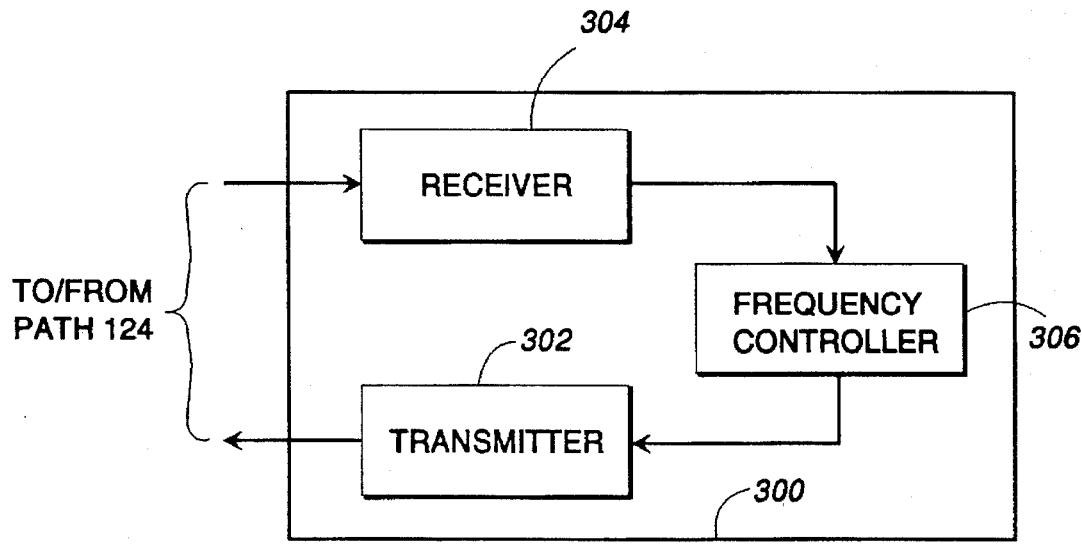
FIG. 3 shows an embodiment of a set top box made in accordance with the present invention.

Referring to FIG. 3, a set top box 300 that may be, e.g., at remote location 122 is shown. The set top box has a transmitter 302, a receiver 304, and a frequency controller 306. Additionally, the set top box has other features as described in U.S. patent application Ser. No. 07/965,492 entitled "Interactive Television Converter" as cited above. In operation, the transmitter 302 transmits an initial upstream signal indicative of the requested bandwidth. The initial upstream signal travels along the path 124 where it is received by the headend 102. The headend 102 processes the initial upstream signal (as described above) and sends the set top box, also via path 124, a second signal. The second signal is received by the receiver 304 of the set top box 300. The second signal is identifies a frequency band within the upstream spectrum over which the set top box 300 may communicate with the headend 102 and, eventually, the server 107. Upon receipt of the second signal, the set top box 300 controls a transmission frequency of the transmitter 302 via the frequency controller 306. Thus, the transmitter 302 will transmit upstream signals in the frequency band corresponding to the second signal. The set top box 300 is now ready to send upstream communications to the headend 102.

Those skilled in the art will appreciate that there are many variations to the illustrative embodiment described above. As a first example, the ITV processor, while shown illustratively as the headend 102, may reside in the server 107, a combination of the headend 102 and the server 107, or other processors. As a second example, those skilled in the art will recognize that the "interference" in an upstream channel in the above described embodiment referred to noise leaking into, e.g., poorly shielded and/or badly installed connectors from a variety of sources. However, those skilled in the art will appreciate that "interference" may be found to exist on an upstream channel if, e.g., another user is already assigned to the upstream channel. Thus, "interference" is not limited to interference based upon "noise." As a third example, the field of use of the invention is not limited to an ITV system. Instead, the invention may be used in any environment comprising a multiuser interactive processor. For example, the user terminal device could be an interactive video game console (with the ability to communicate to, e.g., a dedicated games server. Further, the user terminal device could be a personal computer (with appropriate modem, etc. . .). As a fourth example, the measure of interference may be a measure of a portion of the upstream spectrum vis-a-vis other portions of the spectrum. For example, a system could compare the power level of a given upstream channel to the average power level of all upstream channels in the upstream spectrum. As a fifth example, the measure of interference may be based upon only historical measurements or only real time measurements. As a sixth example, due to the cost of the set of spectrum analysis equipment 114, the controller 110 could poll each receiver in the set of other receivers 120 so that no set of spectrum analysis equipment 114 would be needed for the set of other receivers 120. This would help with the scenario wherein the system monitors the requested bandwidth dynamically, as explained above. As a seventh example, if a system had more than one first set of fiber optic cables 104 and associated equipment (e.g., another set of receivers), the controller could poll not only receivers in the set of receivers 108 but could also poll receivers in the other set of receivers as appropriate. Other variations will be apparent to those skilled in the art. Thus, the invention is defined by the appended claims.

What I claim is:

1. A method comprising:
   (a) receiving an initial upstream signal from a user terminal device at a multiuser interactive processor, the initial upstream signal being associated with a frequency within an upstream spectrum;
   (b) based upon a measure of interference associated with at least a portion of the upstream spectrum, selecting an upstream channel, the upstream channel being contained within the upstream spectrum; and
   (c) transmitting from the multiuser interactive processor to the user terminal device a second signal representative of the upstream channel.

2. The method of claim 1 wherein the measure of interference is defined based upon a history of the measure of interference associated with the upstream spectrum.

3. The method of claim 1 wherein the measure of interference is determined dynamically based upon a set of current interference signals in the upstream spectrum.

4. The method of claim 1 wherein the multiuser interactive processor is an interactive television processor.

5. The method of claim 1 wherein the initial upstream signal comprises an indication of a requested upstream channel bandwidth and wherein the step of selecting the upstream channel is also based upon the requested upstream channel bandwidth.

6. The method of claim 1 wherein the measure of interference is associated with the upstream channel.

7. A method of operating a multiuser interactive processor to allocate a set of upstream channels to a set of user terminal devices, the set of upstream channels being within an upstream spectrum, the multiuser interactive processor and the set of user terminal devices forming a communications system, the multiuser interactive processor being currently in communication with a first user terminal device from the set of user terminal devices, the method comprising:
   (a) receiving from a second user terminal device in the set of user terminal devices an initial upstream signal representing a request for an upstream channel;
   (b) based upon a set of one or more measures of interference associated with one or more portions of the upstream spectrum, selecting an upstream channel from within the upstream spectrum; and
   (c) transmitting to the second user terminal device a signal representative of the upstream channel.

8. The method of claim 7 wherein the measure of interference is defined based upon a history of the set of one or more measures of interference associated with the upstream spectrum.

9. The method of claim 7 wherein the measure of interference is determined dynamically based upon a set of current interference signals in the upstream spectrum.

10. The method of claim 7 wherein the multiuser interactive processor is an interactive television processor.

11. The method of claim 7 wherein the upstream signal comprises an indication of a requested upstream channel bandwidth and wherein the step of selecting the upstream channel is also based upon the requested upstream channel bandwidth.

12. The method of claim 7 wherein the measure of interference is associated with the upstream channel.

13. An apparatus for interactive communications comprising:
   (a) means for transmitting an initial upstream signal indicative of a requested bandwidth;
   (b) means for receiving a second signal representative of an upstream channel wherein the second signal is based upon a measure of interference associated with at least a portion of an upstream spectrum, the upstream channel being contained within the upstream spectrum;
   (c) means for controlling a transmission frequency of the means for transmitting.

14. The apparatus of claim 13 wherein the measure of interference is defined based upon a history of the measure of interference associated with the upstream spectrum.

15. The apparatus of claim 13 wherein the measure of interference is determined dynamically based upon a set of current interference signals in the upstream spectrum.

16. The apparatus for interactive communications of claim 13 wherein the interactive communications are interactive television communications.

17. The apparatus of claim 13 wherein the initial upstream signal comprises an indication of a requested upstream channel bandwidth and wherein the second signal is also representative of the requested upstream channel bandwidth.

18. The apparatus of claim 13 wherein the measure of interference is associated with the upstream channel.

* * * * *